United States Patent Office 2,763,664
Patented Sept. 18, 1956

2,763,664
PROCESS FOR MANUFACTURING β-BUTYROLACTONE FROM DIKETENE

Johann Sixt, Munich, Germany, assignor to Wacker-Chemie G. m. b. H., Munich, Germany, a corporation No Drawing. Application July 1, 1953,
Serial No. 365,524

Claims priority, application Germany December 6, 1952

3 Claims. (Cl. 260—343.9)

This invention relates to the manufacture of β-butyrolactone from diketene, and it has for its object to provide a novel and improved process for this purpose.

Another object of the invention is to provide a simple and efficient process for producing β-butyrolactone by the substantially complete hydrogenation of diketene, without generating appreciable quantities of by-products, and, if desired, without even using elevated pressures.

Still another object is to perform the foregoing process while inhibiting polymerization of the sensitive diketene.

Various other objects and advantages will be apparent as the nature of the invention is more fully disclosed.

It is known to hydrogenate diketene to produce various compounds, depending upon the type of catalyst employed. In the presence of platinum, butyraldehyde is generated; while in the presence of a Raney nickel catalyst under pressure at about 60° C., β-butyrolactone is produced. However, in the latter case the yield is unsatisfactory since a large quantity of butyric acid, and a considerable amount of worthless residue, are obtained.

I have now discovered that it is possible to hydrogenate diketene practically completely to form β-butyrolactone, without generating appreciable quantities of by-products, and even without the use of elevated pressure, if the operation is performed in the presence of palladium as catalyst.

In order to prevent the polymerization of the sensitive diketene as far as possible, I prefer that the hydrogenation be performed at low temperatures, in the neighborhood of 0° C. or even lower, although the application of higher temperatures is not to be precluded. The absorption of hydrogen is accelerated if the diketene is diluted with inert liquids, for example ethyl acetate. The absorption of the hydrogen practically ceases for a short time when the formation of β-butyrolactone is completed, so that the end of the hydrogenation can be recognized without difficulty. I have further found that the catalyst is effective for a very long time, it being impossible to observe any exhaustion even after a prolonged period of use. The palladium is preferably used in the form of palladium black which may be precipitated, if necessary, upon carriers.

Example

Hydrogen is introduced into 4 mol freshly distilled diketene in an agitator maintained at 0° C., containing 4% of acetic acid anhydride, preferably diluted with double the quantity of ethyl acetate, and 1 g. palladium black, the hydrogen being quickly absorbed. As soon as the absorption of the hydrogen ceases the catalyst is permitted to settle, is filtered, and the esters is distilled. At least 93% of the diketene employed is hydrogenated to β-butyrolactone which is practically free from butyric acid. The hydrogenation can also be performed at pressures above atmospheric.

Although a specific example is given herein for purposes of illustration, it will be evident to those skilled in the art that the invention is capable of various modifications and adaptations within the scope of the appended claims.

The invention claimed is:

1. Process for producing β-butyrolactone which comprises hydrogenating diketene at a temperature in the neighborhood of 0° C. in the presence of palladium as catalyst.

2. Process according to claim 1, characterized by the fact that the diketene employed in the process is diluted with an inert solvent.

3. Process according to claim 1, in which the hydrogenation is performed at a pressure above atmospheric.

References Cited in the file of this patent
UNITED STATES PATENTS 2,484,498    Hagemeyer _____ Oct. 11, 1949

FOREIGN PATENTS 688,269    Great Britain _____ Mar. 1953

OTHER REFERENCES

Ellis: "Hydrogenation of Organic Substances," D. Van Nostrand New York, 3rd Ed. (1930), pp. 87, 97. (Copy available in Scientific Library.)

Johnson & Gross: American Chemical Society, N. Y. Meeting 1935. (Copies available in Scientific Library.)